United States Patent [19]

Dil et al.

[11] 4,325,135
[45] Apr. 13, 1982

[54] OPTICAL RECORD CARRIER AND APPARATUS FOR READING IT

[75] Inventors: Jan G. Dil; Jacobus P. J. Heemskerk, both of Eindhoven, Netherlands

[73] Assignee: U.S. Philips Corporation, New York, N.Y.

[21] Appl. No.: 87,276

[22] Filed: Oct. 22, 1979

[30] Foreign Application Priority Data

Sep. 3, 1979 [NL] Netherlands ............................ 7906576

[51] Int. Cl.$^3$ ............................................. G11B 7/00
[52] U.S. Cl. .................................... 369/110; 358/5; 358/128.6; 369/47; 369/94; 369/109; 369/111; 369/112; 369/118; 369/122; 369/275
[58] Field of Search ................. 179/100.1 G, 100.3 V, 179/100.3 G, 100.3 B, 100.4 C; 358/128.5, 128.6; 365/215, 234, 127, 124, 121, 122; 346/76 L, 108; 369/111, 110, 109, 275

[56] References Cited

U.S. PATENT DOCUMENTS

| | | | |
|---|---|---|---|
| 3,314,052 | 4/1967 | Lohmann | 365/127 X |
| 3,348,217 | 10/1967 | Snaper | 365/127 X |
| 3,855,426 | 12/1974 | Bouwhuis | 179/100.3 V |
| 4,084,185 | 4/1978 | de Lang et al. | 179/100.3 V |
| 4,161,752 | 7/1979 | Basilico | 179/100.3 V |
| 4,167,024 | 9/1979 | Hamisch | 179/100.1 G |
| 4,209,793 | 6/1980 | Ueno | 179/100.3 V |
| 4,209,804 | 6/1980 | Dil | 358/128.5 |

FOREIGN PATENT DOCUMENTS

2524473 12/1976 Fed. Rep. of Germany ... 179/100.4 C

*Primary Examiner*—John H. Wolff
*Assistant Examiner*—Donald McElheny, Jr.
*Attorney, Agent, or Firm*—Thomas A. Briody; William J. Streeter; Algy Tamoshunas

[57] ABSTRACT

A record carrier is disclosed having an optically readable information structure comprising trackwise arranged information areas, as well as an apparatus for reading said record carrier. By using two mutually perpendicularly polarized beams components for reading and by giving the information areas of adjacent track portions a different geometries such that areas of one geometry can be read in an optimum manner by only one of the beam components and is virtually not observed by the other beam component, the track distance can be reduced without increasing the crosstalk, so that the information content of the record carrier is increased.

41 Claims, 23 Drawing Figures

OPTICAL RECORD CARRIER AND APPARATUS FOR READING IT

BACKGROUND OF THE INVENTION

The invention relates to a record carrier containing information in an optically readable information structure comprising trackwise arranged information areas which alternate in the track direction with intermediate areas, adjacent track portions differing from each other in that they comprise information areas of a first type and information areas of a second type respectively. The invention also relates to apparatus for reading such a record carrier.

Such a record carrier and apparatus are known, inter alia from Netherlands Patent Application No. 78 06378 which has been laid open to public inspection. The known record carrier may contain a television program, while the information being encoded in the frequency and/or the dimensions of the information areas in the track direction. These information areas are formed by pits pressed in the carrier surface. Except for those in the track direction, the dimensions of the information pits may be the same for the entire information structure. Alternatively, the information may be encoded in digital form, in which case the information areas also have the same dimensions in the track direction. A specific combination of the information areas and intermediate areas then represents a specific combination of digital zeros and ones.

In such optical record carriers, it is desirable to maximize the information density, and hence maximize the playing time, for example, of a recorded television program. For this purpose, the tracks would have to be arranged as closely as possible to each other. However, the distance between the tracks cannot be arbitrarily small. In known record carriers, in which the information areas of the adjacent tracks have the same geometry except for the dimension in the track direction, all the information areas influence the radiation of the read beam in the same manner. The read spot formed on the information structure by the read beam is a diffraction-limited radiation spot with a specific intensity distribution. The half-value diameter of this spot, i.e. the distance between two points in the spot where the intensity equals $1/e^2$ of intensity in the centre of the spot, is of the order of the track width. This means that, even in the case of a correct tracking some of the radiation of the read spot will be incident beyond the track being read, and may even be incident on adjacent tracks. The amount of radiation incident on the adjacent tracks increases as the track distance decreases. A portion of the radiation which is incident on the adjacent tracks and which is modulated by the information areas of these tracks can reach a radiation detector which receives the radiation modulated by the track being read. This effect, the crosstalk effect, determines the minimum distance between the tracks.

In Netherlands Patent Application No. 78 06378, which has been laid open to public inspection, it is proposed to increase the information density by making the information pits of the adjacent tracks, i.e. the information areas of a first and a second type respectively, of different depths and by reading these tracks with beams of different wavelengths. The depths and the wavelengths are selected so that the information pits of a first track produce maximum modulation in a beam of a first wavelength, while the information pits of adjacent, second, tracks have little influence on said beam, i.e.: are hardly observed by said beam. The pits of the second track, however, produce maximum modulation in a beam of a second wavelength, which beam in turn is hardly influenced by the information pits of the first track. The tracks can then be arranged substantially more closely to each other, without excessive crosstalk.

However, this arrangement presents some practical problems. Firstly, two radiation sources are required for producing two beams of different wavelengths, so that the read apparatus becomes more complex. Secondly, for adequately separated read-out of the two types of pits, comparatively deep pits, of the order of a few times the wavelength of their associated read beam, have to be formed with an accuracy of the order of a tenth of the wavelength of the read beam. This is a technologically difficult problem.

SUMMARY OF THE INVENTION

It is the object of the present invention to increase the information density in a record carrier for information, such as a television program, an audio program, or digital information, for example from and for a computer, without these disadvantages. To this end, in accordance with a first feature of the invention, a record carrier is characterized in that all the information areas are elongate. The information areas are of two types, the first type having a geometry such that they produce maximum modulation in a first read-beam component whose direction of polarization is parallel to the longitudinal direction of those information areas and whose effective wavelength is at least of the order of magnitude of the width of the information areas. The information areas of the first type, moreover, produce minimum modulation in a second read-beam component whose direction of polarization is transverse to the longitudinal direction of the information areas and whose effective wavelength is equal to that of the first read-beam component. The information areas of the second type have a geometry such that they produce minimum modulation in the first read-beam component and moreover produce a maximum modulation in the second read-beam component.

The statement that "all information areas are elongate" is to be understood to mean that over the entire record carrier the dimension in one direction (the longitudinal direction) of these areas is at least of the order of one-and-a-half times as great as the dimension transverse to this direction. Preferably, the lengths of the information areas are at least twice as great as the effective wavelength of the read beam. The polarization effects employed in accordance with the invention may begin to occur if the lengths of the information areas are approximately one and a half times their width. In previously proposed disk-shaped record carriers containing the same amount of information per track circumference, the average length of the information areas was proportional to the track radius. For tracks on the inner side of the record carrier the average length of the information areas was comparatively short and approximately equal to the width of the areas.

The information structure of the record carrier may be a phase structure. The information areas may then be formed by pits pressed in the record carrier surface or by hills projecting from this surface. The information structure may alternatively be an amplitude structure. The information areas are then, for example, nonreflecting information areas in a reflecting surface. Furthermore, the information structure may be a structure which is read either in reflection or in transmission.

The direction of polarization of the optical read beam, which is a beam of electromagnetic radiation, is to be understood to mean the direction of the electrical vector, i.e. the E-vector.

The effective wavelength of the read beam is the wavelength at the location of the information structure. If the information structure is covered with a protective layer having a refractive index n, the effective wavelength is then the wavelength in vacuum divided by n.

In general, when reading the information structure under consideration, which may be regarded as a diffraction structure, steps can be taken to ensure that if the centre of the read spot coincides with the centre of the information area destructive interference occurs between the zero-order beam and the first-order beams. The output signal of a radiation-sensitive detector, which converts the read beam into an electrical signal, will then be minimum if the centres of the read spot and of an information area coincide, and maximum if the read beam is incident in between two information areas. For a satisfactory modulation of the detector signal, the information areas should have a specific phase depth. The phase depth of the information structure is to be understood to mean the difference between the phase of the zero spectral-order and one of the first spectral orders, formed by the information structure, if the centre of the read spot coincides with the centre of an information area. In a first-order approximation it may then be assumed that the different first orders have the same phase. The phase depth depends on the geometry of the information areas and in the case of information pits specifically on the geometrical depth of the pits and on the angle of inclination of the walls of the pits.

Which phase depth is optimum when reading a specific information structure depends on the read method being used. An optical information structure may be read in accordance with the central-aperture read method or in accordance with the so-called differential read method. In the case of the central-aperture method all radiation coming from the record carrier and passing through the pupil of the read objective is concentrated on a single detector. In the case of the differential read method two are employed which detectors are arranged in the far field of the information structure and which are arranged after each other viewed in the track direction. The difference signal obtained by these detectors represents the information being read. The far field of the information structure may be represented by a plane in which the centres of gravity of the subbeams formed by the information structure, in particular the zero-order subbeam and the first-order subbeams, are separated. The optimum phase depth, $\psi_{C.A.}$ for an information structure which is adapted to be read with the central aperture method is approximately 180°, while the optimum phase depth, $\psi_{D.I.}$ for an information structure which is adapted to be read with the differential method is approximately 110°.

In accordance with the invention use is made of the fact that when elongate information areas are read with a read beam whose effective wavelength is of the order of magnitude of the width of the areas, the direction of polarization of the read beam will play a part. It has been found that for the information structure under consideration, information pits, if read with a parallel-polarized read beam, i.e. with a beam whose E-vector is parallel to the longitudinal direction of the pits, effectively seem to be less deep, or in other words have a smaller phase depth, than the same pits if read with a perpendicularly polarized read beam. In order to obtain a desired phase depth for an optimum read-out, in the case of the information structure under consideration, the information pits, should be effectively deeper in the case of reading with a parallel-polarized read beam than in the case of reading with a perpendicularly polarized read beam. Information pits which have been optimized for read out by a parallel-polarized read beam are generally not optimized for read-out with a perpendicularly polarized read beam and may even geometrically be dimensioned so that they are hardly observed by the last-mentioned beam. Obviously the same applies to information hills. When the information areas of two adjacent tracks are dimensioned for two mutually perpendicular directions of polarization, the track distance may be considerably smaller, for example twice as small, relative to the distance between two tracks of known record carriers which comprise only one type of information areas, without an increased risk of crosstalk. The information density may then be increased for example by a factor two.

The polarization effects are greatly determined by the optical contrast between the information areas and their surrounding and by the sharpness of the edges of the information areas. The optical contrast is determined by the extinction coefficient and the refractive index of the material of the information layer. This layer is, for example, a metal layer. The polarization effects are smaller in the case of reading in transmission than in the case of reading in reflection, though still sufficient to be used for differential read-out in transmission.

A first embodiment of a record carrier in accordance with the invention, in which the longitudinal directions of the two types of information areas coincide with the longitudinal direction of the tracks in which said areas are situated, the two types of information areas differ from each other in that at least one of those dimensions of said areas which are not determined by the information stored is different.

The information areas can be made to differ from each other by making the maximum width, i.e. the width in the plane of then intermediate areas, different. However, in practice, in the case of information areas in the form of pits or hills, a different geometrical depth, or height, and/or a different angle of inclination of the walls of the areas will be selected because this is simpler to realize.

The first embodiment of the record carrier in accordance with the invention may further be characterized in that the first type of information areas, observed with a first read-beam component, have a phase depth equal to that of the second type of information areas, observed with the second read-beam component. When such a record carrier is read, only one read method is used, either the central aperture method or the differential method.

It is alternatively possible, to read one type of information pits or hills with the central aperture method and the other type with the differential read method. A record carrier which is suitable for this is characterized in that the first type of information areas, observed with the first read-beam component, have a first phase depth which differs from a phase depth of the second type of information areas, observed with the second read-beam component.

Preferably, the first phase depth is then approximately 110° and the second phase depth approximately 180°.

It is not necessary for the two types of information areas to have different dimensions. The different geometries for the two types of information areas may be, and are preferably, realized by making the orientations of the information areas different. The preferred embodiment of a record carrier in accordance with the invention, in which the two types of information areas have the same dimensions, is characterized in that the longitudinal direction of the first type of information areas is transverse to that of the second type.

The information areas of the first type are read with a read-beam component which is polarized in a first direction, for example the longitudinal direction of these areas, and the information areas of the second type with a read beam component which is polarized in a second direction, transverse to the first direction. In such a structure, a "fishbone" structure, the longitudinal directions of the information areas make an angle of for example 45° with the track directions and a maximum information density is obtained. An information structure with information areas of uniform dimensions may be used to store digital information and also analog information. In the last-mentioned case the information is encoded in the frequency of and/or the distance between the information areas.

In case of a disk-shaped record carrier, adjacent track portions may contain information areas of the first type and information areas of the second type, respectively. Preferably, the information structure then comprises two spiral tracks, the first and the second track respectively, containing information areas of the first and the second type, the track revolutions of the first spiral track being situated between those of the second spiral track. When this record carrier is read one spiral track is scanned completely and subsequently the second spiral track.

It is alternatively possible that the consecutive track portions within one track revolution differ from each other in that they comprise information areas of the first type and information areas of the second type, respectively. This information structure is advantageous if two read methods are to be used.

A third embodiment of a record carrier in accordance with the invention is provided with two information layers. One information layer contains only information areas of a first type and the second information layer only information areas of the second type.

It has already been proposed, inter alia in U.S. Pat. No. 3,853,426, to increase the information content of an optically readable record carrier by arranging two information layers at different levels in the record carrier body. In order to avoid cross-talk from the other information layer when reading out one layer, the information layers should be spaced apart by a distance which is large relative to the depth of focus of the read objective.

This gives rise to the problem that the read beam has to be focussed through a comparatively thick layer, so that the aberrations of the read objective will play a part. Moreover, the focussing of the read objective must be readjusted upon each transition from one information layer to second layer. However, when the first information layer contains a first type of information areas and the second information layer a second type of information areas and a first and a second read-beam component with mutually perpendicular directions of polarization are employed for reading, in such a way that the first type of information areas produce maximum modulation in the first read-beam component and are virtually not observed by the second read beam component, while the second type of information areas produce maximum modulation in the second read-beam component and are hardly observed by the first read-beam component, the two information layers may be situated close to each other, namely within the depth of focus of the read objective and can yet be read separately.

The track portions of the first information layer may be situated above those of the second information layer. An even better read-out separation of the two information layers is obtained if the track portions of the first information layer are situated between those of the second information layer.

A record carrier with two information layers may further be characterized in that each information layer comprises two types of information areas, those track portions of the two information layers which comprise the same type of information areas being arranged adjacent each other. For this record carrier the information density may be four times as great as that of known record carrier with only one type of information areas.

In addition to storing prerecorded information, the record carrier of the invention may also be used for recording information written by the user himself. Such a record carrier, which is described inter alia in the previous Netherlands Patent Application No. 78 02859 U.S. Ser. No. 140,409, filed Apr. 14, 1980 is provided with an optically detectable so-called servo track. The servo track comprises sector addresses whose number is constant, for example 128, per track revolution. The sector addresses cover only a small part of the servo track. The record carrier portions between the sector addresses are provided with an inscribable material, for example a thin metal layer, in which the user can write the desired information with a laser beam, by locally melting the metal. A sector address inter alia, contains address information relating to the associated inscribable record carrier portion in the form of address information areas which are spaced from each other by intermediate areas. In accordance with the invention the information areas of two adjacent sector addresses may have mutually perpendicular longitudinal directions. As a result of this, the information density in this type of record carriers can also be increased. In a record carrier portion which corresponds to a specific sector address information can be written in the information areas having the same orientation as the address information areas in the sector address.

The invention may also be applied to an inscribable record carrier in which the information areas of all sector addresses have the same orientation and the same dimensions. It is namely possible that, in a "blank" portion of the record carrier corresponding to a specific sector address, two information tracks are recorded by the user. If such a record carrier has been inscribed with information which is useful to a specific user, it is provided an optically detectable servo track which includes sector addresses. The information associated with a specific sector address is contained in two information tracks, of which at least one information track is shifted relative to the servo track and transverse to the track direction, and that the longitudinal direction of the information areas in an information track is transverse to that of the information areas in the second information track.

In accordance with the invention, an apparatus for reading the record carrier is provided with an optical read system comprising a radiation source producing a read beam, an objective system for focussing the read beam to a read spot on the information structure, and a radiation-sensitive detection system for converting the read beam which has been modulated by the information structure into an electrical signal. At the location of the information structure, the read beam produce by the optical read system comprises two read beam components, which may be present simultaneously or not, with mutually perpendicular directions of polarization, which are respectively parallel and perpendicular to the longitudinal direction of one type of information areas.

It is to be noted that in the German Patent Application No. 2,634,243, which has been laid open to public inspection, a combined write-read apparatus is described in which two radiation beams with mutually perpendicular directions of polarization are incident on the record carrier. However, these beams are used for simultaneously writing two tracks and to either scan two tracks simultaneously or to generate a tracking signal during read-out. The record carrier then contains only one type of information areas and the directions of polarization of the two beams are not parallel to or perpendicular to the longitudinal direction of the information areas.

In the read apparatus in accordance with the invention during read out only that read beam component may be present at the location of the information structure which corresponds to the type of information areas being read instantaneously. In such an apparatus the direction of polarization of the read beam should be changed in accordance with the type of information areas being read. This may be done, for example, by arranging a half-wave plate between the radiation source and the objective system so that it can be moved into and out of the path of the read beam. Alternatively, it is possible to use, for the the radiation source, a semiconductor diode laser which is mounted for rotation through an angle of 90°. Furthermore, two diode lasers may also be used by mounting them on a common movable support to produce read beams whose directions of polarization are perpendicular to each other. If the read apparatus comprises polarization-sensitive means for separating the read beam which has been modulated by the information structure from the unmodulated beam, a polarization rotator may be arranged between the polarization-sensitive beam splitter and the objective system, which rotator alternately rotates the direction of polarization of both the read beam emitted by the radiation source, which direction makes an angle of 45° with the longitudinal direction of one type of information areas, and the read beam reflected by the information structure through an angle of approximately +45° and an angle of approximately −45°.

It is also possible to use a read beam whose direction of polarization at the location of the information structure makes an angle of approximately 45° with the longitudinal direction of one type of information areas. The read beam may then be considered resolved into a beam component with a direction of polarization parallel to and a beam component with a direction of polarization perpendicular to the longitudinal direction of one type of information areas. The detection system should then be polarization-sensitive in order to enable the information in the two read beam components, both of which are present continuously, to be processed separately. The detection system may then comprise one detector preceded by a rotatable polarization analyser, or a polarization-sensitive beam splitter and two detectors, or one polarization-insensitive beam splitter and two detectors which are each preceded by a polarization analyser.

For inscribing and reading the two types of information areas with substantially perpendicular longitudinal directions relative to each other a combined write/read apparatus may be employed, which has the characteristic features of the aforementioned read apparatus. Such an arrangement further comprises a radiation source producing a write beam, an intensity modulator for switching the intensity of the write beam between a first (write) level and a second, lower, level. The write spot formed on the information layer by the objective system of such an apparatus is elongate and means are provided for positioning the write spot in two positions which differ approximately 90° from each other, in which positions the longitudinal directions of the write spot differ substantially 90°, while said longitudinal directions both make an angle of approximately 45° with the longitudinal direction of the servo track. The intensity modulator may be constituted by means for controlling the power supply of the radiation source.

BRIEF DESCRIPTION OF THE DRAWINGS

The invention will now be described in more detail with reference to the drawing wherein.

DETAILED DESCRIPTION OF THE INVENTION

Figure 1:
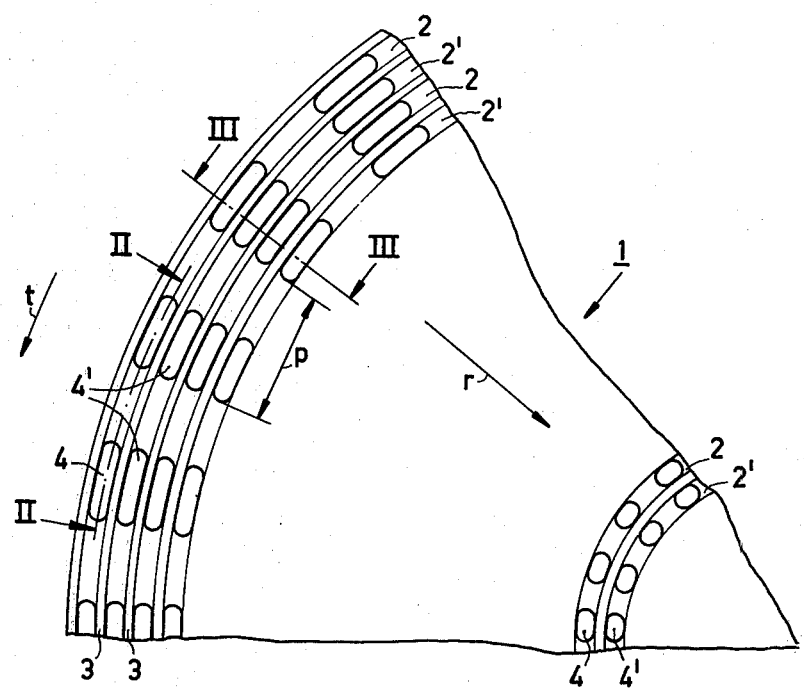
FIG. 1 is an elevation of a small part of a record carrier in accordance with the invention.

As shown in FIG. 1, the record carrier includes an information structure comprising a plurality of information areas 4, 4' which are arranged in accordance with tracks 2, 2', respectively. The areas 4, 4' are spaced from each other in the track direction, or tangential direction t, by intermediate areas 5. The tracks 2, 2' are spaced from each other in the radial direction r by narrow lands 3.

The information areas 4 and 4' may be pits pressed in the record carrier surface or hills projecting from said surface. In the case of central-aperture reading i.e. if the information carrier should have a greater phase depth, the information area will preferably be pits.

The information to be disseminated by means of the record carrier is contained in the variation of the areas structure in the tangential direction only. If a colour television program is stored in the record carrier, the luminance signal may be encoded in the variation of the spatial frequency of the information areas 4 and 4' and the chrominance and audio signal in the variation of the lengths of said areas. The record carrier may alternatively contain digital information. In that case a specific combination of information areas and 4 and 4' and intermediate areas 5 represent a specific combination of digital ones and zeros.

Figure 11:
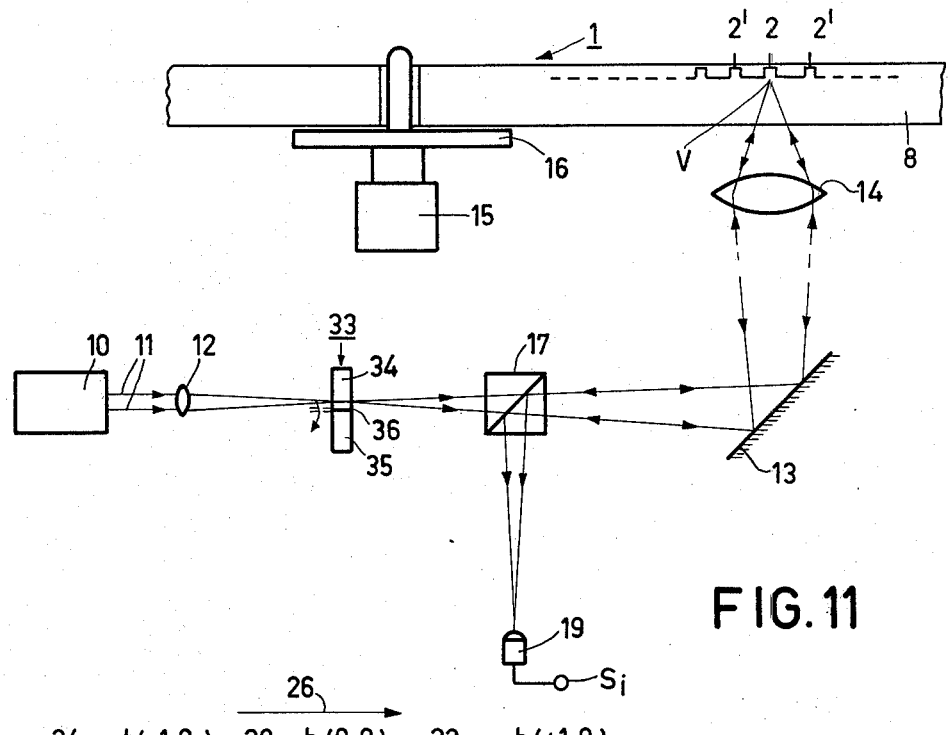
FIG. 11 shows a first embodiment of a read apparatus.

The record carrier can be read with an apparatus which is schematically represented in FIG. 11. A monochromatic and linearly polarized beam 11 which is emitted by a gas laser 10, for example a helium-neon laser, is directed to an objective system 14 by a mirror 13. The path of the radiation beam 11 includes an auxiliary lens 12, which ensures that the pupil of the objective system 14 is filled. In that case a diffraction-limited read spot V is formed on the information structurre. The information structure is schematically represented by the tracks 2, 2': thus, the record carrier is shown in radial cross-section.

The information structure may be located on the side of the record carrier facing the laser. However, preferably, as shown in FIG. 11, the information structure is situated on the side of the record carrier which is remote from the laser, so that reading is effected through the transparent substrate 8 of the record carrier. The advantage of this is that the information structure is protected against fingerprints, dust particles and scratches.

The read beam 11 is reflected by the information structure and, as the record carrier is rotated a platter 16 driven by a motor 15, it is modulated in accordance with the sequence of the information areas 4, 4' and the intermediate areas 5 in a track being read. The modulated read beam again passes through the objective system 14 and is reflected by the mirror 13. In order to separate the modulated portion from the unmodulated portion of the read beam a beam splitter 17 is included in the radiation path. The beam splitter may be a semi-transparent mirror or, alternatively, a polarization-sensitve splitter prism. In the last-mentioned case a quarter-wave plate should be included between the objective system and the splitter prism. The quarter wave is then a quarter of the wavelength of the read beam 11. The beam splitter 17 reflects a portion of the modulated read beam to a radiation-sensitive detection system 19. In the case of the central-aperture read method this detection system comprises a single detector which is disposed on the optical axis of the read system. The output signal $S_i$ of the detector is proportional to the information being read. If of the differential read method is used, the detection system comprises two tangentially spaced detectors, which are arranged in the far field of the information structure. Subtracting the output signals of the detector from each other yields a signal which is modulated in accordance with the information being read.

The information structure is illuminated with a read spot V whose dimension is of the order of magnitude of that of the information areas 4, 4'. The information structure may be regarded as a diffraction grating which splits the read beam into an undiffracted zero spectral order subbeam, a plurality of first spectral order subbeams and a plurality of higher spectral order subbeams. For read-out mainly the subbeams which are diffracted in the longitudinal direction of the tracks are of interest, and of these beams specifically the subbeams which are diffracted in the first orders. The numerical aperture of the objective system and the wavelength of the read beam are chosen so that for the information structure being read the higher-order subbeams for the most part fall outside the pupil of the objective system and are not incident on the detector. Moreover, the amplitudes of the higher-order subbeams are small relative to the amplitudes of the zero-order subbeam and the first-order subbeams.

Figure 12:
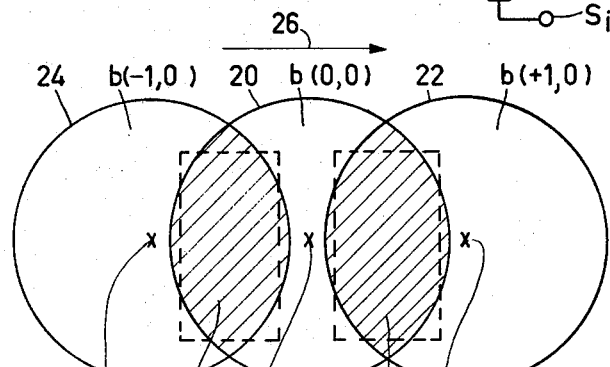
FIG. 12 represents cross-sections, in the far field of the information structure, of the zero-order beam and the first-order beams formed by the information structure.

FIG. 12 represents the cross-sections, in the plane of the exit pupil of the objection system, of the first-order sub-beams which have been diffracted in the track direction. The circle 20 with the centre 21 represents the exist pupil. This circle also represents the cross-section of the zero-order subbeam b(0,0). The circles 22 and 24 with the centres 23 and 25 respectively represent the cross-sections of the first-order subbeam b(+1,0) and b(−1,0), respectively. The arrow 26 represents the track direction. The distance between the centre 21 of the zero-order subbeam and the centres 23 and 25 of the first-order subbeam is determined by $\lambda/p$, where p (compare FIG. 1) represents the spatial period, at the location of the read spot V, of is the areas 2, and $\lambda$ the wavelength of the read beam.

From the method adopted for describing the read operation it follows that in the hatched areas in FIG. 12 the first-order subbeams overlap the zero-order subbeam and interference occurs. The phases of the first-order subbeams vary if the read spot moves relative to an information track. As a result of this the intensity of the total radiation which traverses the exit pupil of the objective system will vary.

When the centre of the read spot coincides with the centre of an information areas 4, 4′ a specific phase difference $\psi$, referred to as the phase depth, will exist between the first-order subbeam and the zero-order subbeam. If the read spot moves to a next area, the phase of the subbeam b(+1,0) increases by $2\pi$. It is therefore correct to state that when the read spot moves in the tangential direction the phase of said subbeam varies by $\omega t$ relative to the zero-order subbeam. Therein $\omega$ is a time frequency which is determined by the spatial frequency of the information areas 2 and by the speed with which the read spot travels over a track. The phase $\phi(+1,0)$ and $\phi(-1,0)$ of the subbeam b(+1,0) and of the subbeam b(-1,0) respectively relative to the zero-order subbeam b(0,0) may be represented by:

$\phi(+1,0) = \psi + \omega t$ and by
$\phi(-1,0) = \psi - \omega t$ respectively.

When the portions of the first-order subbeams and the zero-order subbeams traversing the objective system are combined on one detector, as in the central-aperture read method, the time dependent signal of this detector may be represented by:

$$S_{CA} = B(\psi) \cdot \cos \psi \cdot \cos \omega t.$$

where $B(\psi)$ decreases at decreasing values of $\psi$. In the case of the differential read methods two detectors 19′ and 19″ represented by dashed lines in FIG. 12, are arranged in the areas of overlap of the zero-order subbeam with the first-order subbeams. The time-dependent difference signal from these detectors may be represented by:

$$S_{DI} = B(\psi) \cdot \sin \psi \cdot \sin \omega t$$

Figure 13:
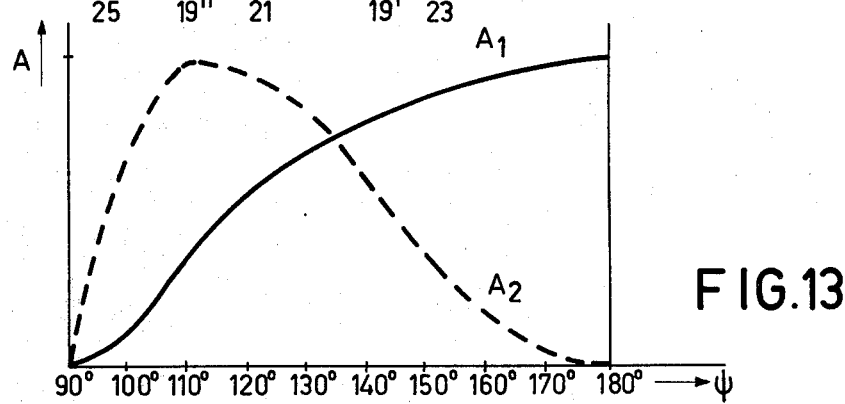
FIG. 13 represents the variation of the amplitude of the information signal as a function of the phase depth.

FIG. 13 represents the variation of the amplitude $A_1 = B(\psi) \cdot \cos \psi$ and of the amplitude $A_2 = B(\psi) \cdot \sin \psi$ as a function of the phase depth $\psi$ as calculated by the Applicant and corroborated by experiments. For $\psi = 90°$ both $A_1$ and $A_2$ are zero. $A_1$ reaches a maximum for $\psi = 180°$. The maximum for $A_2$ is situated at approximately 110°. The depth of an amplitude structure may therefore be said to equal $\pi$.

The values of the phase depth $\psi$ at which, for the two read methods, a maximum destructive and constructive interference occurs between the first-order subbeams and the zero-order subbeam respectively, i.e. a maximum and minimum modulation of the detector signal is obtained, are given in the following Table:

|  | C.A. read-out | D.I. read-out |
|---|---|---|
| Destructive interference | $\psi = \pm(m+1)\pi$ | $\psi = \pm\left(\frac{3}{2}\pi + m\frac{\pi}{2}\right)$ |
| Constructive interference | $\psi = \pm\left(\frac{\pi}{2} m\pi\right)$ | $\psi = \pm\left(\frac{\pi}{2} + m\frac{\pi}{2}\right)$ |

Here m represents an integer. This Table is valid if no powerful subbeams of an order higher than one enter the pupil of the read objective.

Figure 3A:
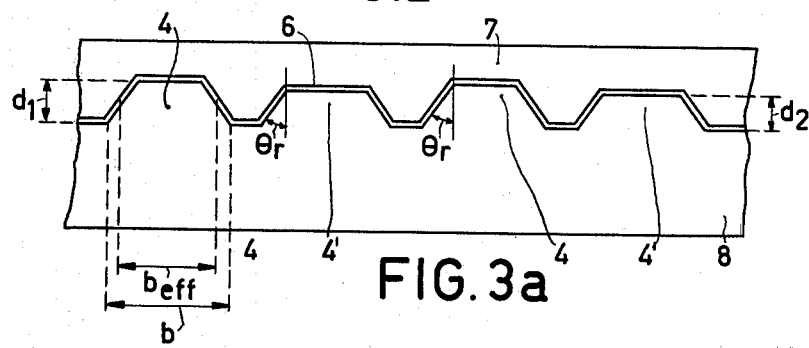
FIG. 3a shows a part of a radial cross-section of a first embodiment of the record carrier.

The phase depth observed by a read beam depends on the geometry of the information areas, specifically the geometrical depth of an information pit, or the geometrical height of an information hill, and on the angle of inclination of the walls of the information areas. Specifically the phase depth also depends on the effective wavelength of the read beam relative to the width b of the information areas, in the plane of the intermediate areas and the lands 3. If the effective wavelength is of the same order of magnitude as or greater than the width b of the information areas, the state of polarization of the read beam will have a substantial influence on the phase depth. The direction of polarization of the read beam will already play a part at an effective wavelength which is approximately 1.5 times the effective width ($b_{eff}$) of the information areas. The width b and the effective width ($b_{eff}$) are represented in FIG. 3a.

Figure 14:
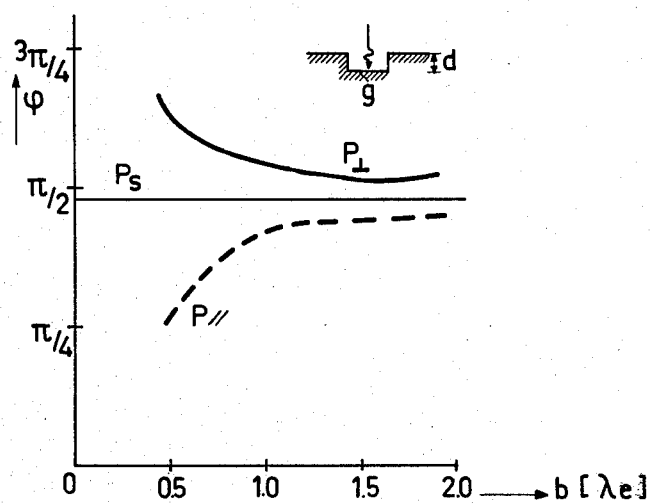
FIG. 14 represents the variation of the phase difference produced in a read beam by continuous groove as a function of the width of said groove, and for different directions of polarization.

The influence of the state of polarization on the phase depth $\psi$ is illustrated by FIG. 14, which represents the theoretical variation of the phase $\phi$ of the local electromagnetic field at the bottom relative to the field at the top of a continuous groove g as a function of the width b of the groove, expressed in the effective wavelength $\lambda_e$. The groove g, which is also shown in FIG. 14 has a depth of $0.24\lambda_e$. The curves $P_\parallel$ and $P_\perp$ represent the variation of the relative phase $\phi$ for parallel and perpendicularly polarized radiation, respectively, while the straight line $P_S$ represents the variation of the relative phase $\phi$ as predicted by the scaler diffraction theory, in whoch no allowance is made for the direction of polarization of the radiation. FIG. 14 shows that as soon the width of the groove g becomes of the order of magnitude of the effective wavelength, the phase $\phi$ for the various directions of polarization becomes different. According as the width b decreases relative to the effective wavelength, the curves $P_\parallel$ and $P_\perp$ will deviate more from each other and from $P_S$.

Figure 15:
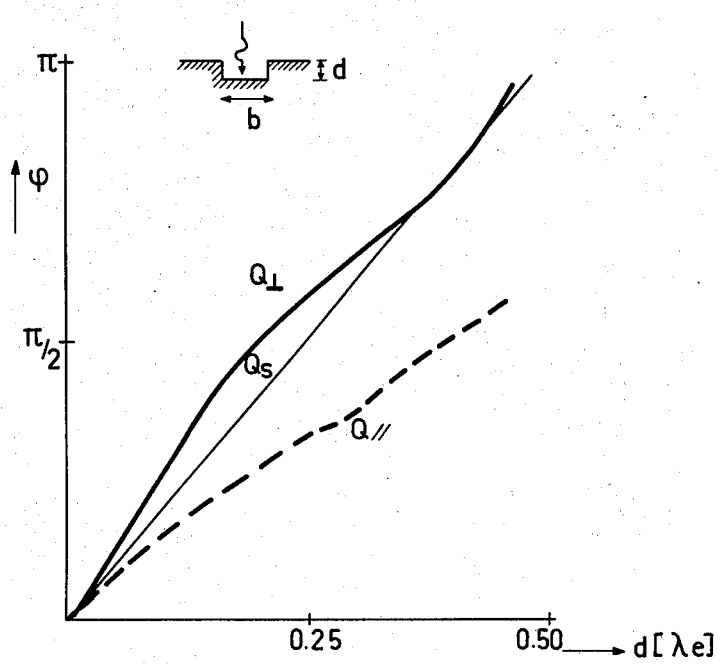
FIG. 15 represents the variation of the phase difference produced in a read beam by a continuous groove as a function of the depth of said groove and for different directions of polarization.

For a specific width, FIG. 15 $b = 0.64\lambda_e$, shows the variation of the relative phase $\phi$ as a function of the depth d, expressed in $\lambda_e$, for the various directions of polarization by means of the curves $Q_\parallel$ and $Q_\perp$, $Q_S$ represents the variation of the relative phase $\phi$ as predicted by the scalar diffraction theory. There is a direct relationship between the relative phase $\phi$ shown in the FIGS. 14 and 15 and the phase depth $\psi$ defined in the foregoing; if $\phi$ increases from 0 to $\pi/2$ rad. the phase depth $\psi$ will increase from $\pi/2$ to $\pi$ rad. This applies strictly to the scaler diffraction theory and in approximation to the vectorial diffraction theory. From FIG. 15 it is apparent that the phase depth of $\pi$ rad. required for optimum central-aperture reading, which corresponds to a relative phase $\phi = \pi/2$ rad. is reached at a groove depth of approximately $0.20\pi_e$ in the case of perpendicularly polarized radiation. For this groove depth the phase depth for parallel polarized radiation is approximately $\pi/2$ rad., so that the groove is virtually not observed with this radiation in the central-aperture mode. For an optimum read-out of the groove with parallel-polarized radiation in accordance with the central-aperture method the groove depth should be approximately $0.4\lambda_e$. For this groove depth the phase depth for perpendicularly polarized radiation is approximately $1.5\pi$ rad.

It is to be noted that FIGS. 14 and 15 apply to a continuous groove. For tracks comprising information areas, the relative phase $\phi$ will exhibit a similar variation for the various directions of polarization.

The effect illustrated by FIGS. 14 and 15 is employed in order to increase the information density. Depending on the wavelength of the read beam to be used, the width of the information areas is selected such that $\lambda_{eff}$ is greater than or substantially equal to $b_{eff}$. If a He-Ne laser beam with a wavelength $\lambda_o = 633$ nm is used and the information is read through a substrate with a refractive index $n = 1.5$, the track width should at most be of the order of 420 nm, where $\lambda_o$ is the wavelength in free space. The record carrier can also be read by means of a beam produced by a semiconductor diode laser, such an AlGaAs laser whose wavelength may be between 780 nm. and 860 nm. When such a beam is used, in the case of read-out through a substrate for which $n = 1.5$, the track width should at most be of the order of 520 nm to 570 nm.

Moreover, care is taken that all information areas are elongate, i.e. that their length is at least of the order of one and a half timer their width, because only for this type of information areas a difference in phase depth is obtained between perpendicularly polarized radiation and parallel-polarized radiation. Preferably, the length of the information areas is at least twice the effective wavelength.

Furthermore, for two adjacent track portions the information areas in one track portion are optimized for read-out with perpendicularly polarized radiation and the information areas of the second track portion for read-out with parallel-polarized radiation. As has been demonstrated by means of FIGS. 14 and 15 this optimization can be achieved by appropriate choice of the geometrical depths of the information areas.

In FIGS. 14 and 15 it has been assumed that the groove g has perpendicular walls. However, in practice the walls of the information areas will have an angle of inclination which differs from zero degrees owing to the methods of recording and copying used in the manufacture of the record carrier.

As described in the article: "Laser beam recording of video-master disks" in: "Applied Optics" Vol. 17, No. 3, pages 2001–2006, the information is inscribed on a so-called master by exposing a photo-resist layer on a substrate to a laser beam whose intensity is modulated in accordance with the information to be written. After exposure, the photoresist is developed, yielding a pit structure or a hill structure. Merely due to the intensity distribution of the write beam, the ultimate record carrier will have oblique walls. The developing process also affects the wall steepness since the wall steepness with developing time increases. From the developed master mother disks are made in known manner, which in turn are used to make matrices. The matrices can then be used to press a large number of record carriers. In order to facilitate separation of the replicas from the matrix, the angle of inclination of the wall should preferably be as large as possible. In order to obtain a desired effective depth of the information areas or height of the information hills, the geometrical depth or height should be greater than in the case of information areas with perpendicular walls.

Figure 2:
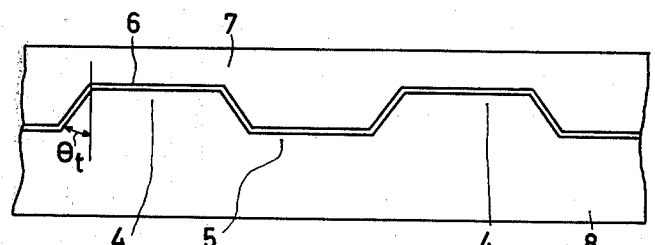
FIG. 2 shows a part of a tangential cross-section of this record carrier.

FIG. 2 shows a small part of the tangential cross-section of the record carrier of FIG. 1, while FIG. 3a shows a part of this record carrier in radial cross-section. The information structure may be covered with a layer 6 of a well-reflecting material, such as silver or aluminium or titanium. It is to be noted that the polarization effects are stronger according as the optical conductivity of the layer 6 increases. Deposit on the layer 6 is a protective layer 7 which protects the information structure from mechanical damage such as scratches. Furthermore, the tangential angle of inclination $\theta_t$ and the radial angle of inclination $\theta_r$ are given in FIGS. 2 and 3a. These angles of inclination are of the same order of magnitude.

The desired difference between the effective depths of the two types of information areas 4 and 4' can be realized, as is indicated in FIG. 3a, by selecting different geometrical depths $d_1$ and $d_2$ for the two areas. The areas 4 are then read with parallel-polarized radiation and the areas 4' are read with perpendicularly polarized radiation.

Figure 3B:
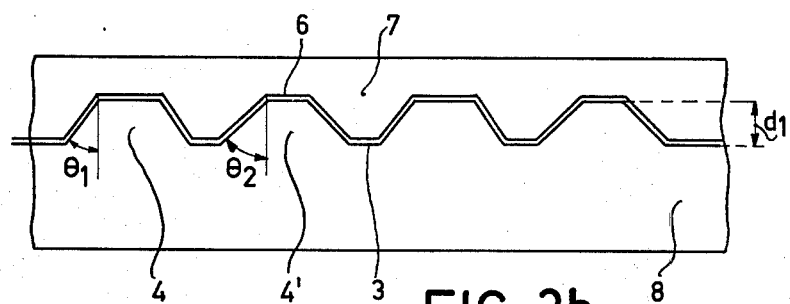
FIG. 3b shows a part of a radial cross-section of a second embodiment of the record carrier.

The desired difference between the effective depths, as shown in FIG. 3b, can also be realized by making the radial angle of inclination $\theta_1$ of the information areas 4 smaller than the radial angle of inclination $\theta_2$ of the information areas 4'. In an embodiment of a record carrier shown in FIG. 3b which is adapted to be read entirely in the central-aperture mode and in which the information areas are pits with a depth of approximately 220 nm and a width b of approximately 375 nm, the angle of inclination $\theta_1$ is approximately 25° and the angle of inclination $\theta_2$ approximately 55°. The refractive index n of the protective layer 8 is 1.5 and the layer 6 is a silver layer. This record carrier is intended to be read with a read wavelength of 820 nm with a read objective with a numerical aperture of 0.58.

In the embodiment of a record carrier of the type shows in FIG. 3b, which is to be read entirely in the differential mode, the information areas may also be hills with a height of approximately 150 nm and a width b of approximately 625 nm. The angle of inclination of the hills, which are read with parallel-polarized radiation is approximately 57° and the angle of inclination of the hills which are read with perpendicularly polarized radiation is approximately 25°. In this record carrier the layer 6 is also a silver layer and the refractive index n of the protective layer 8 is 1.5. The read wavelength is again 820 nm and the numerical aperture of the read objective is 0.54.

Obviously, it is also possible to have information areas 4 and 4' with different geometrical depths and the angles of inclination.

Figure 4:
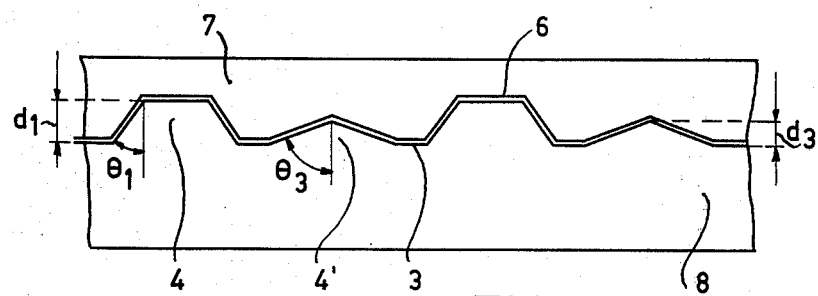
FIG. 4 shows a radial cross-section of a small part of a third embodiment of the record carrier.

The information areas shown in FIGS. 3 and 3b have been optimized for one read method. However, it is also possible to optimize the information areas 4 for central-aperture reading and the information areas 4' for differential reading. FIG. 4 shows a radial cross-section of a small part of a record carrier designed for this purpose. The information areas 4', which have a phase depth $\phi = 110°$, are now so shallow that they have a V-shaped structure.

A record carrier with two types of information pits which have been optimized for reading by means of a perpendicularly polarized read beam and a parallel polarized read beam respectively, may also be designed to be read readable entirely readable by means of the differential method. In that case the radial cross-sections of both the information pits 4 and of the information pits 4' will be V-shaped. The difference between the effective depths of the information areas 4 and 4' is then solely determined by the radial angles of inclination of the information areas.

Figure 5:
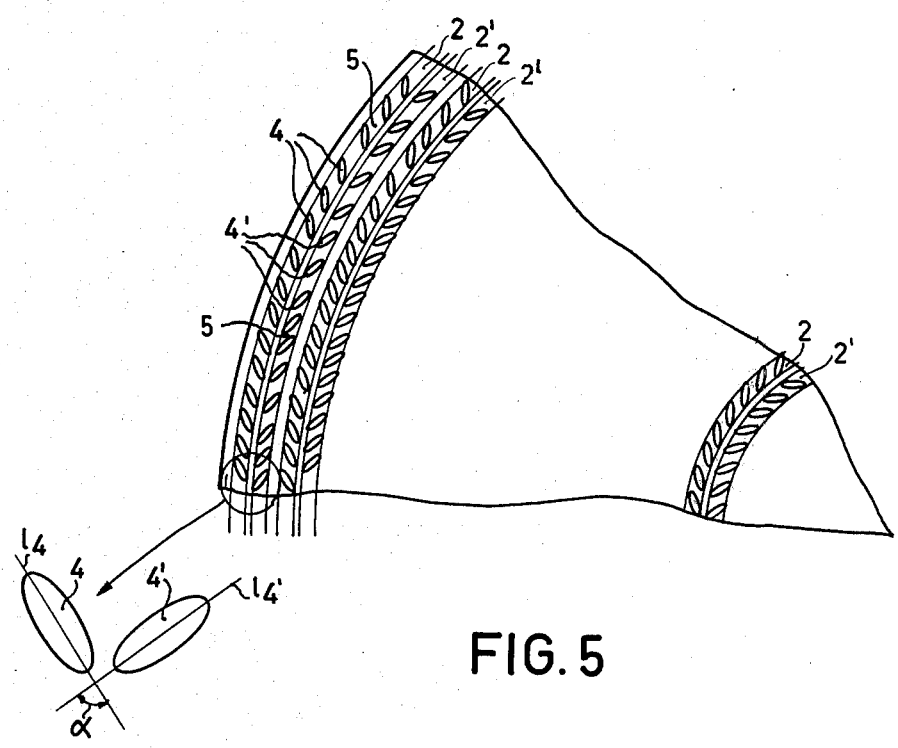
FIG. 5 shows an elevation of a record carrier in which the longitudinal directions of the two types of information areas are transverse to each other.

The information areas can be distinguished by their orientation, as well as by their dimensions. FIG. 5 is a plan view of a small part of such a record carrier. The information areas 4 and the information areas 4' all have the same dimensions, also in their longitudinal directions $1_4$ and $1_{4'}$. The longitudinal direction $1_4$ of the information areas 4 make an angle $\alpha$, which is preferably 90°, with the longitudinal directions $1_{4'}$ of the information areas 4'. In an information structure with this type of information areas a digital signal may be stored, a specific combination of information areas 4 and 4' and intermediate areas 5 representing a specific combination of digital zeros and ones. The information areas 4 and 4' in accordance with FIG. 5 may also be used for the storage of analog information. The information is then contained in the mutual distances between the information areas 4 and those between the information areas 4'.

The information areas 4 are read with a read beam whose direction of polarization is transverse to their longitudinal direction $1_4$. For the information areas 4' this read beam is parallel-polarized and these information areas are virtually not observed by said read beam.

In an embodiment of a record carrier in accordance with FIG. 5. which is adapted to be read in the central aperture mode, the information areas are pits with a depth of approximately 220 nm, a width b of approximately 375 nm and an angle of inclination of approximately 55°. The refractive index n of the layer 8 is 1.5 and the layer 6 is a silver layer. This recording is intended to be read by means of a wavelength of 820 nm and via a read objective with a numerical aperture of 0.58.

Figure 6:
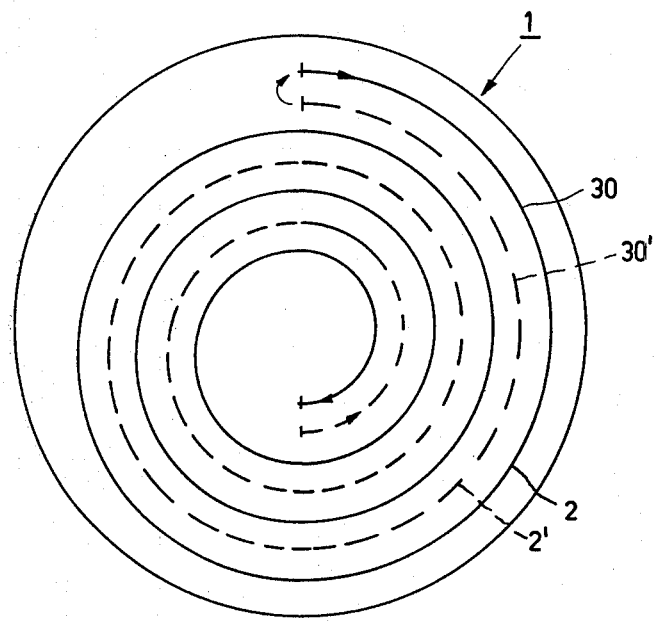
FIG. 6 is an elevation of a record carrier with two spiral tracks.

In the case of a record carrier which is adapted to be read entirely in either the central aperture mode or the differential mode, the adjacent track portions have different types of information areas. Preferably, as shown in FIG. 6, such a record carrier comprises two spiral tracks, the turns 2 of the one spiral 30 being interposed between the turns 2' of the other spiral 30'. When the spiral 30' is read the optical read head is for example moved from the inner edge of the record carrier towards the outer edge. After the last turn of this spiral has been read, the direction of rotation of the motor by means of which the record carrier is driven reversed and the read head is moved over the record carrier from the outer edge to the inner edge, so that the spiral 30 is scanned in the reverse direction.

In the case of a record carrier wherein one type of information areas have been optimized for central aperture reading and the second type of information areas for differential reading, the two detectors by means of which the differential information signal is determined may also be employed to obtain the central aperture information signal. In the last-mentioned case the output signals of the two detectors are added. The detectors are then connected to an electronic circuit, in which the detector signals are combined additively in first time intervals and subtractively in second time intervals. The resulting signals are then further processed and rendered suitable for reproduction for example on a video or an audio apparatus. The transfer function of the system in which the detector signals are added differs slightly from the system in which the detector signals are subtracted from each other. If the information is stored in digital form, the change in transfer function when changing from one track to a next track, will not be perceptible in the signal which is ultimately delivered by the read apparatus. If the information is recorded in a different manner, for example in the form of a frequency-modulated signal, the changeover between the transfer functions may become perceptible. One transfer function may, for example, cause different grey shades or a different saturation in the television picture than the other transfer function. In the case of an audio signal the changeover between the transfer functions may become audible as an undesired frequency.

If a television program is stored in a record carrier in which one television picture per revolution is written, flicker at a frequency of 12.5 Hz will occur at a speed of rotation of 25 revolution/sec, as a result of the variation in the grey shades or in the colour saturation. Flicker of this frequency is still perceptible to the human eye and is therefore annoying.

Figure 7:
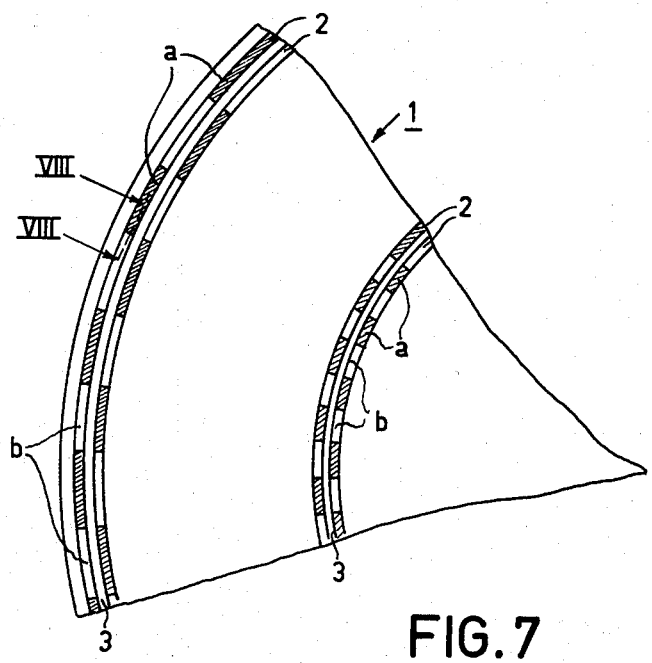
FIG. 7 is a view of a part of a record carrier containing different types of information areas per track.

In order to render this effect invisible the information areas of consecutive track portions within one track may be made different. FIG. 7 shows a part of such an embodiment of a record carrier. This Figure shows a larger part of the record carrier than FIG. 1, so that the individual information areas can no longer be distinguished. The information tracks have been divided into portions a, which comprise information areas which are read with a first direction of polarization in the differential mode, and portions b, which comprise information areas which are read with the second direction of polarization in the central aperture mode. Preferably, the perpendicularly polarized beam is used in the central-aperture mode and the parallel-polarized beam is the differential mode.

Figure 8:
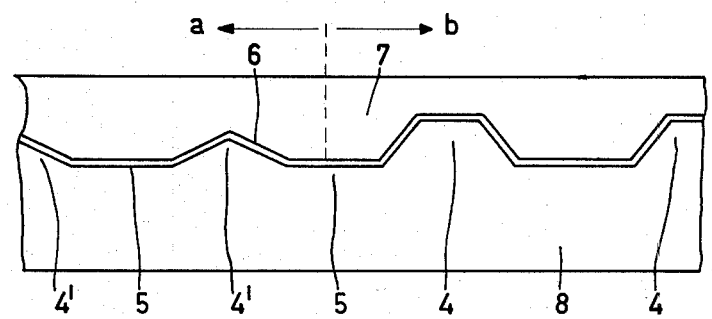
FIG. 8 is a tangential cross-section of a part of this record carrier.

FIG. 8 is a tangential cross-section of a part of the record carrier of FIG. 7, at the location of the transition from a track portion a to a track portion b. After the foregoing this Figure is self-explanatory.

In the case of a television program, each of the track portions a and b contains the information of one television line. If the television picture comprises 625 lines, switching between one read system and the other is effected at a frequency of the order of 7.5 kHz. Flicker at this high frequency is no longer visible.

In order to effect a correctly timed changeover from addition of the detector signals to subtraction of these signals and vice versa during read out, the record carrier may contain a pilot signal at the location of the transitions between the track portions a and b. Such a pilot signal may also be recorded on a record carrier containing an audio program.

If a television signal has been recorded, the field synchronizing impulses or the picture synchronizing pulses may be used as switching signal, so that no separate pilot signal is needed.

Figure 9:
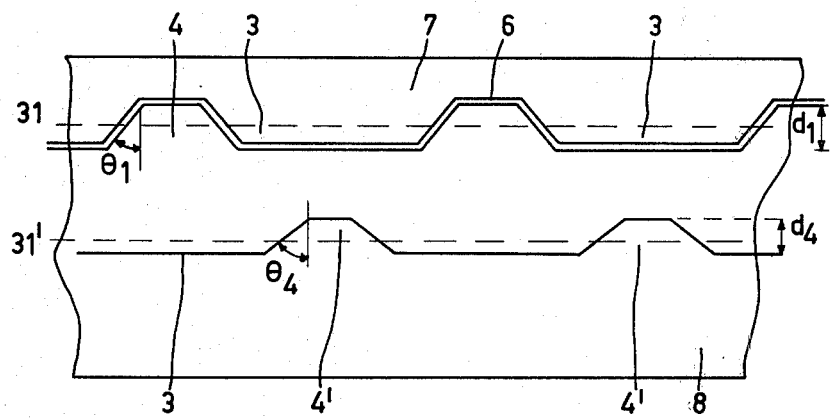
FIG. 9 is a radial cross-section of a part of a record carrier with two information layers.

FIG. 9 in radial cross-section shows a small part of a record carrier comprising two information layers 31 and 31'. The information layer 31 comprises a first type of information areas 4 and the information layer 31' a second type of information areas 4'. Either the angles of inclination ($\theta_1$ and $\theta_4$) or the depths ($d_1$ and $d_4$) or, as is shown in FIG. 9, both the angles of inclination and the depths of the areas 4 and 4', which may again be pits or hills, may then differ. It is alternatively possible that the information areas 4 and 4' all have the same dimensions and that the longitudinal directions of the areas 4 are transverse to those of the areas 4'.

The track portions of the information layer 31 may be situated directly above those of the information layer 31'. Alternatively, as shown in FIG. 9, the track portions of one information layer are preferably situated opposite the lands between adjacent tracks on the other information layer.

Figure 10:
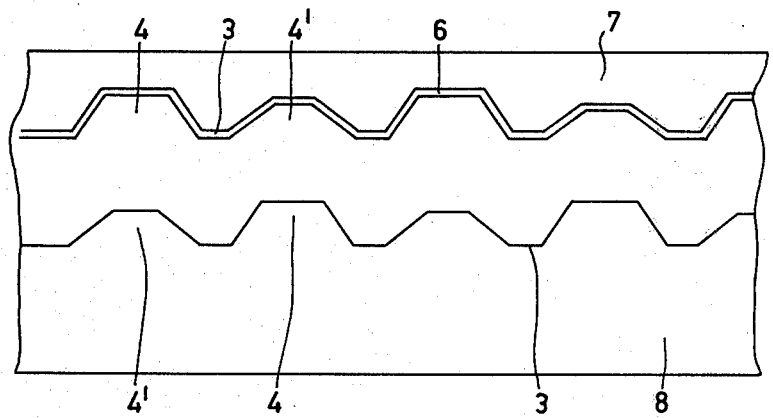
FIG. 10 is a radial cross-section of a record carrier with two information layers which each contain two types of information areas.

In a record carrier with two information layers these layers may alternatively each contain two types of information areas. A radial cross-section of a small part of such a record carrier is shown in FIG. 10. In each of the information layers the track period may then be reduced by, for example, a factor two, so that the total information content is for example a factor four greater than the information content of a known record carrier with only one information layer and one type of information areas. The track portions of the first information layer, which comprise information areas of a first type, should then be interposed between the track portions of the second information layer, which comprises information areas of the same type, as is shown in FIG. 10.

It is to be note that in this Figure, as well as in the preceding Figures, the dimensions of the information areas have been exaggerated relative to, for example, the thickness of the substrate 8 for the sake of clarity.

In, for example, the previous Netherlands Patent Application No. 78 02859 it has been proposed to employ an optical record carrier as a storage medium for information other than video information, and specifically as a storage medium in which information can be wirtten by the user himself. Examples of this is information supplied by an (office) computer or radiograms in a hospital. For this application the user is supplied with a record carrier which is provided with, for example, a spiral, servo track which extends over the entire record carrier area.

During the recording of the information by the user the radial position of the write spot of the servo track is detected and corrected with the aid of an optoelectronic servo system, so that the information is written with great accuracy in a spiral track of constant pitch, or in concentric tracks with a constant track distance. The servo track is divided into a large number of sectors, for example 148 per track revolution.

Figure 16:
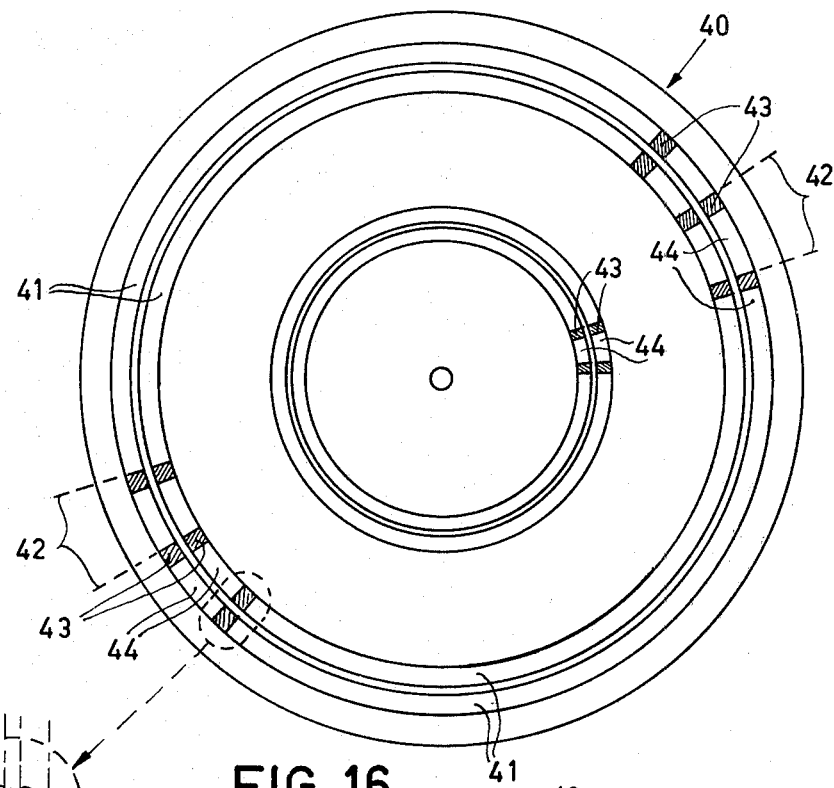
FIG. 16 is an elevation of a record carrier in which information can be written by a user.

FIG. 16 shows such a record carrier 40. The concentric servo tracks are designated 41 and the sectors are designated 42. Each sector comprises a track portion 44, in which information may be written and a sector address 43, in which in addition to other control information the address of the associated track portion 44 is encoded in for example digital form in address information areas 45. The address information areas are spaced from each other in the track direction by intermediate areas 46. The address information areas are preferably pits pressed into the record carrier surface or hills projecting from this surface.

In accordance with the invention, as shown in the inset of FIG. 16, the longitudinal directions of the address information areas 45 and 45' of two adjacent sector addresses are perpendicular or substantially perpendicular to each other and these areas have uniform dimensions. These dimensions have been selected, relative to the wavelength of the read beam, such that they produce maximum modulation in a read beam component with a direction of polarization parallel to their longitudinal direction and at the same time are virtually not observed by a read beam component with a direction of polarization transverse to their longitudinal direction. The two servo track portions with mutually perpendicularly oriented address information areas may be arranged close to each other when two mutually perpendicularly polarized read beams components are used, so that the information density can be very high.

It is then necessary that the information areas which are written into two adjacent blank track portions 44 are distinct from each other, for example in respect of their orientations. In the inset of FIG. 16 these information areas 47 and 47' are shown dashed.

For the sake of clarity the width of the tracks 41 in FIG. 16 has been exaggerated relative to the lengths of the sectors 42.

Figure 17:
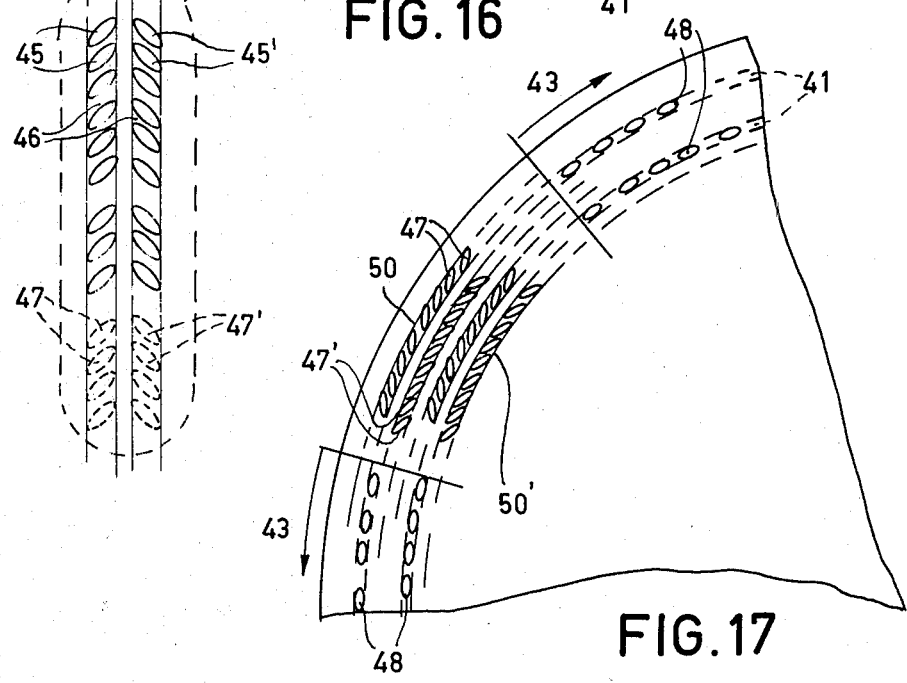
FIG. 17 is an elevation of a part of a record carrier inscribed by a user.

The invention may also be employed for the recording of information by the user. In the record carrier which is furnished to the user the address information areas in the sector addresses will for example all have the same orientation and dimensions. The information recorded by the user will now be distributed over two tracks which are for example situated on both sides of the servo track, the longitudinal direction of information areas in the first information track being transverse to that of the information areas in the second track. FIG. 17 shows a small part of such a record carrier inscribed by the user.

The sector addresses 43 of the tracks 41 comprise address information areas 48. Each sector address 43 is associated with a specific information block. The information of such a block is divided over two information portions 50 and 50'. The longitudinal direction of the information areas 47 in the information track portion 50 is transverse to that of the information areas 47' of the information track portion 50'.

It is alternatively possible that one of the information track portions 50 and 50' coincides with a blank track portion 44.

The information recorded in the two information track portions 50 and 50' need not belong to one block of information, but may also be of a different sort and for example form part of two different programs.

In an embodiment of a record carrier which has been inscribed by the user, in which the information layer is a metal layer and the information areas 47 and 47' comprise pits melted into said layer, the width of the information areas 47 and 47' is approximately 270 nm. These areas are written and read with a diode laser beam having a wavelength of 820 nm, with an objective having a numerical aperture of approximately 0.58 and via a substrate having a refractive index $n=1.5$. A width of the information areas between 200 and 400 nm then still yields acceptable results.

The read beam components with mutually perpendicular directions of polarization required for reading the record carrier can be obtained in different ways. As shown in FIG. 11, a plate 33, which is pivotable about an axis 36, may be included in the radiation path before a polarization-insensitive beam splitter 17. Said plate may comprise two parts 34 and 35, the part 34 being of a birefringent material and constituting a half-wave plate for the radiation used, whereas the part 35 is for example of glass. The source 10 emits linearly polarized radiation, whose direction of polarization is for example parallel to the longitudinal direction of the information areas on the record carrier. When the part 35 of the plate 33 is situated in the radiation path, the direction of polarization of the beam 11 is changed, and this beam is suitable for reading one type of information areas. If the part 35 of the plate 33 is situated in the radiation path, the direction of polarization of the read beam 11 is rotated through 90° and this beam is suitable for reading the second type of information areas.

The plate 33 is preferably situated at the location of the smallest constriction of the beam 11. It may also be interposed between the auxiliary lens 12 and the radiation source 10.

The plate 33 may also be employed if the so-called feedback effect is employed when reading is effected by means of a diode laser as radiation source. Use is then made of the fact that when the radiation beam emitted by the diode laser is reflected to the diode laser by the record carrier, the intensity of the emitted laser beam and the electrical resistance of the diode laser will increase. When an information track of the record carrier is scanned with such a laser beam the said intensity and electrical resistance will vary in accordance with the sequence of information areas in the relevant track. The record carrier may then be read by, for example, detecting the intensity variations of the laser beam by means of a photodiode at the rear of the diode laser. In that case no beam splitter is necessary in order to separate the incident and the reflected beam from each other.

Also when in a read apparatus employing the feedback effect the half-wave plate is included in the beam, the direction of polarization of the read beam received by the diode laser will be the same as that of the beam emitted by the diode laser, because said plate is traversed twice.

The two beam components with mutually perpendicular directions of polarization can also be obtained by mounting the laser source on a support which is movable between two positions which are approximately 90° apart. In this case the use of a semiconductor diode laser as radiation source is to be preferred. It is alternatively possible to employ two diode lasers, which emit radiation beams whose directions of polarization are transverse to each other. These lasers may be mounted on a common support. By rotating this support the direction of polarization of the radiation which is projected onto the information structure may be changed.

The signals for rotating the plate 33 or the laser source may be derived from the signal read from the record carrier. Said record carrier is then provided with marks which indicate when the direction of polarization of the read beam is to be changed.

Figure 18:
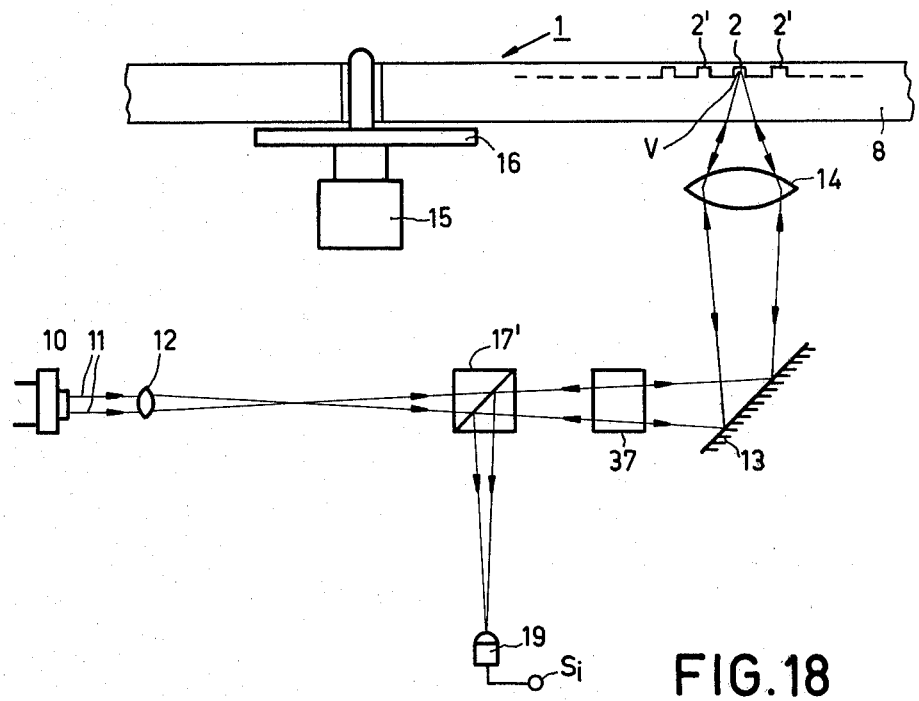
FIG. 18 shows a second embodiment of a read apparatus.

The methods described in the foregoing for obtaining two mutually perpendicularly polarized beam components cannot be used in a read apparatus which already includes polarization-sensitive elements. In that the solution illustrated in FIG. 18 can be used. In this Figure a polarization-sensitive splitter prism 17' is employed for separating the read beam which has been modulated by the information structure from the beam emitted by the source. The radiation source 10 is a diode laser which emits a linearly polarized beam, whose direction of polarization makes an angle of 45° with the longitudinal direction of one type of information areas on the record carrier. The radiation path includes a polarization rotator 37 behind the prism 17'. The rotator is capable of rotating the direction of polarization of both the beam emitted by the radiation source 10 and that of the beam reflected by the information structure through 45° anticlockwise or through 45° clockwise. The polarization rotator may be a Faraday rotator. By means of this rotator the direction of polarization of the read beam can be switched between parallel and transverse to the longitudinal direction of the information areas and vice versa, or for reading the record carrier in accordance with FIG. 5 between parallel to the longitudinal direction of the first type of information areas and parallel to the longitudinal direction of the second type of information areas. The polarization rotator 37 also ensures that the read beam which has been modulated by the information structure has a direction of polarization which is transverse to that of the beam emitted by the source, so that the first-mentioned beam is reflected out of the radiation path and to the detector 19 by the polarization-sensitive prism 17'.

In the embodiment of the read apparatus discussed so far the record carrier is always read with radiation having only one direction of polarization, and all the radiation produced by the radiation source is utilized for the read-out.

In a further embodiment of the read apparatus the direction of polarization of the read beam at the location of the information structure makes an angle of 45° with the longitudinal direction of the information areas. This beam may be regarded as comprising two beam components, of which the first component having a direction of polarization which is parallel to the longitudinal direction of the information areas and the second having a direction of polarization which is transverse to said longitudinal direction. In such an apparatus the radiation-sensitive detection system should be polarization-sensitive.

Figures 19, 20:
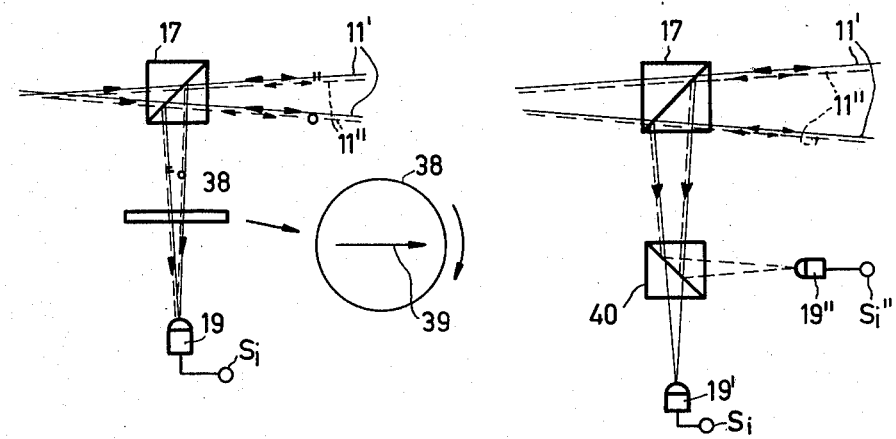
FIG. 19 shows a first embodiment of a polarization-sensitive detection system for the read apparatus.
FIG. 20 shows a second embodiment of such a detection system, FIG. 21 schematically represents a first embodiment of a combine write/read apparatus, and FIG. 22 schematically represents a second embodiment of such an apparatus.

For this purpose, as is shown in FIG. 19, a rotatable polarization analyser 38, whose direction of transmission is designated 39, may be included in front of before a single detector 19. FIG. 19 shows only the part of the read apparatus near the detector 19. For the remainder the apparatus is similar to that of FIG. 11, the plate 33 being dispensed with. In FIG. 19 the beam component with mutually perpendicular directions of polarization are represented by the solid lines 11' and the dashed lines 11'' respectively. In reality the beams 11' and 11'' coincide. In the shown position of the analyser the beam 11' is transmitted to the detector and a first type of information areas can be read. If the analyser is rotated through 90° the beam 11'' is transmitted and the second type of information areas can be read.

As is shown in FIG. 20, the polarisation-sensitive detection system may also be constituted by a polarization-sensitive splitter prism 40 and two detectors 19' and 19''. The prism 40 transmits the beam 11' with a first derection of polarization to the detector 19' and reflects the beam 11'' with a second direction of polarization transverse to the first direction of polarization, to the detector 19''. The output single Si' of the detector 19' represents the information which is stored in the first type of information areas and the output signal Si'' of the detector 19'' the information stored in the second type of information areas. In an electronic circuit, not shown, for processing the detector signals provisions are then made for alternately transferring the signal Si' and the signal Si''.

In a further embodiment of a polarization-sensitive detection system the polarization-sensitive prism 40 of FIG. 20 has been replaced by a neutral beam splitter and there has been provided a polarization analyser for each of the detectors 19' and 19''. The directions of transmission of the two analysers are transverse to each other.

It is conveivable that the directions of polarization of the read beam components are not exactly parallel to and transverse to the longitudinal direction of one type of information areas, i.e. for the read directions indicated in FIGS. 19 and 20: that the directions of polarization of the read beam do not make an exact angle of 45° with the track direction. This enables the signal of one of the read beam components to be increased relative to the signal of the other read beam component. In this way the tolerances for one type of information areas, if these are more difficult to realize, may be increased. The deviation in the directions of polarization could be of the order of 20% to 30%.

Equipment by means of which the information can both be written and read is known. For example in the previous Netherlands patent application No. 78 02 859, which is described herein by reference, a combined write-read apparatus is described, in which the write beam and the read beam are produced by the same radiation source. In this apparatus the intensity of the beam produced by the radiation source is switched between a first (write) level and a second level, for example by means of an intensity modulator, which second level is sufficiently high to read information but not high enough to record information. In Netherlands patent application No. 74 02289, which has been laid open to public inspection, a write apparatus is described, in which a read spot is projected on the information layer at a short distance behind a write spot. By means of this read spot it is possible to check whether the information just recorded corresponds to the information to be written.

Figure 21:
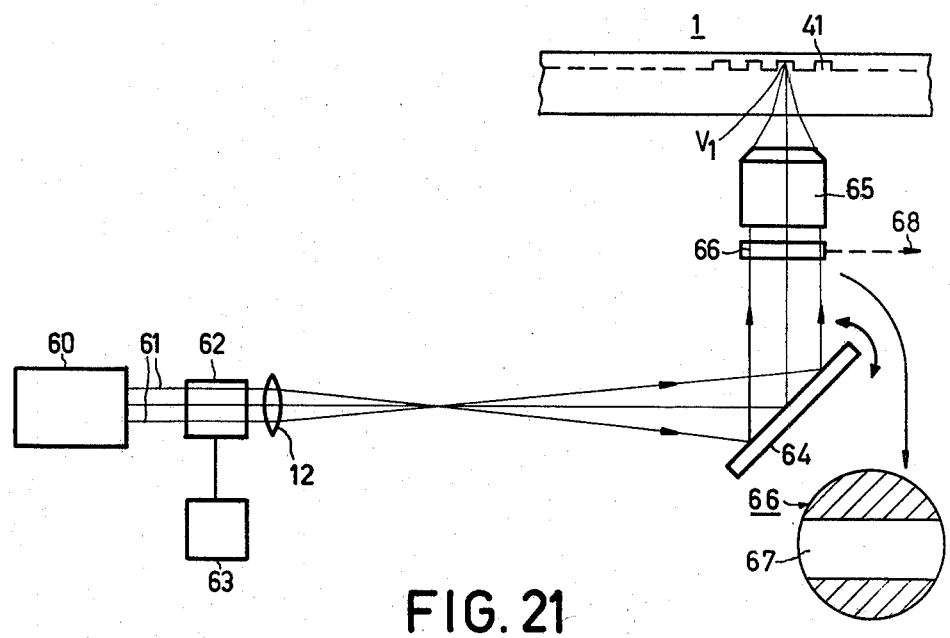

FIG. 21 shows those elements of a combined write-read apparatus which are relevant for the present invention. As radiation source a gas laser 60 is used, for example a HeNe laser. The intensity of the laser beam 61 is varied with the aid of an intensity modulator 62, for example an acousto-optical modulator or an electro-optical modulator, which is controlled by a control circuit 63. The laser beam is reflected to the objective system 65 by a rotatable mirror 64, which objective system focuses the beam to a radiation spot V in the information plane, represented by the servo tracks 41 of the record carrier 1.

An elongate write spot, whose longitudinal direction is adjustable can be obtained by including in the radiation path, preferably as closely as possible to the entrance pupil of the objective system 65, a rotatable diaphragm 66 with an aperture slit 67. If the diaphragm is not included, the beam 61 completely fills the pupil of the objective system and a diffraction-limited circular radiation spot is formed on the information layer. If the diaphragm is included in the radiation path, the beam 61 is completely transmitted in one direction, namely the direction of the aperture slit 67, and is stopped for the most part in a direction transverse thereto. The pupil of the objective system 65 is then no longer filled in an optimum manner. The write spot is then an elongate spot whose longitudinal direction is transverse to the longitudinal direction of the aperture slit. If the aperture slit 67 were to have the position shown in FIG. 21, the longitudinal direction of the elongate spot would coincide with the track direction. In reality, the aperture slit may assume two orientations, namely at angle of +45° and −45° relative to the position shown in FIG. 21, so that the longitudinal direction of the write spot can make angles of +45° and −45° with the longitudinal direction of the tracks.

During reading the diaphragm is moved out of the radiation path, preferably as indicated by the arrow 68 in FIG. 21, so that the read spot is again a circular radiation spot.

The elongate write spot with adjustable orientation can also be obtained by a rotatable cylindrical lens instead of with a rotatable diaphragm.

Figure 22:
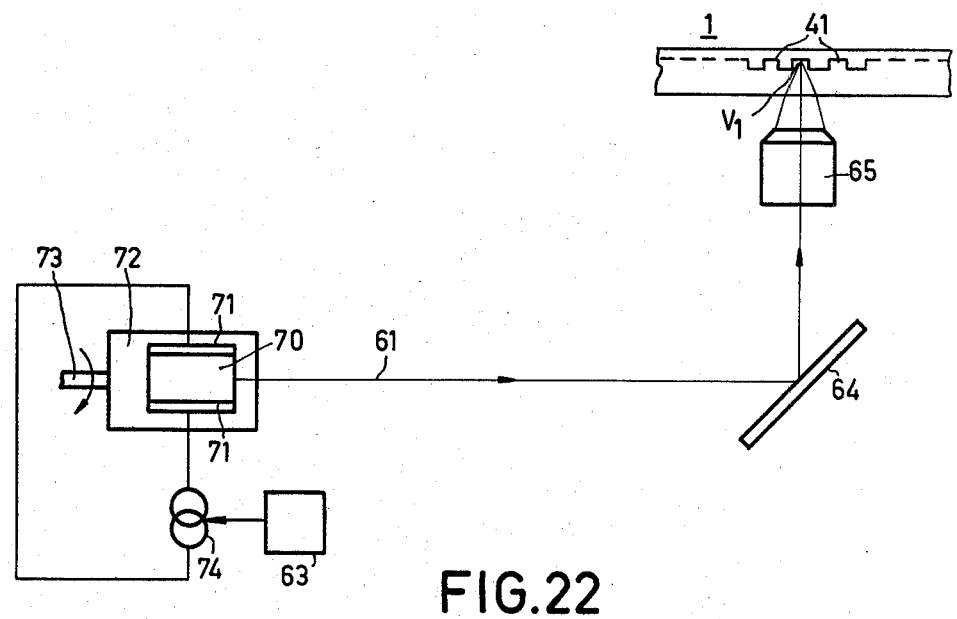

The diaphragm or the cylindrical lens may also be used in an apparatus employing a diode laser as radiation source. Such a diode laser is designated 70 in FIG. 22. The intensity of the beam produced by the diode laser can be controlled by varying the electric current through the electrodes 71 on the diode laser 70. The electric current is supplied by a current source 74, which is controlled by means of a control circuit 63. In many cases a diode laser produced as astigmatic beam, i.e. a beam having a cross-section which is greater in a first direction, for example by a factor two, than in a direction transverse to the first direction. If the pupil of the objective system is to be filled completely by means of a diode laser, an additional element, for example a cylindrical lens, should be included in the radiation path for correcting the astigmatism. However, in the combined write-read apparatus effective use can be made of the astigmatism of the diode laser. By passing the diode-laser beam through the objective system without correction an elongate radiation spot is obtained. The orientation of this spot relative to the tracks can be adjusted by rotating the diode laser 70. For this purpose the laser may be mounted on a holder 72, which is rotatable about an axis 73.

In the embodiments of the write-read apparatus described so far the polarization components required during read-out are obtained in one of the manners described with reference to FIGS. 11, 18, 19 and 20.

If by means of the apparatus near each sector address two information track portions (50 and 50' in FIG. 17) are to be written and read, the radiation spot should be moved after the first information track portion has been written or read respectively in a direction transverse to the track direction over a distance euqal to the width of the servo track plus the width of one information track portion (in the case of FIG. 17) or over a distance equal to the width of the servo track, if one of the information track portions 50 or 50' coincides with the servo track. For this movement of the radiation spot use can be made of the pivotable mirror 64 which has already been provided in the apparatus for the purpose of tracking. During writing the servo track is used as reference for positioning the write spot. During reading both the servo track and an information track portion 50 or 50' may be used as reference.

During writing or reading of two information track portions 50 and 50' a sector 42 is scanned twice, one information track portion 50 or 50' being written or read during each scan.

When inscribing the two types of information areas whose longitudinal directions are transverse to each other, advantageous use can be made of an effect which is known per se. When an objective system with a high numerical aperture is used the distribution of the electric field energy within the radiation spot, which field energy ensures that pits are burnt into the information layer, is namely astigmatic. In respect of the electric field energy the spot is larger in the direction of polarization of the radiation than in a direction transverse to the direction of polarization. When an objective system is used having a numerical aperture of 0.85 the length is 30% greater than the width. By suitably selecting the direction of polarization of the laser beam in the apparatus of FIG. 22, the effective write spot can be made narrower by the use of said effect.

What is claimed is:

1. A record carrier containing information in a form readable by a read beam of polarized radiation, said carrier comprising an information structure having a first plurality of spaced apart, elongated information areas which define a first track portion and wich have a width at most of the order of magnitude of the effective wavelength of the radiation and a geometry such that said information areas of said first plurality produce maximum modulation of the read beam when the radiation is polarized in a first direction parallel to the longitudinal direction of said information areas of said first plurality and produce minimum modulation of the read beam when the radiation is polarized in a second direction transverse to said longitudinal direction thereof, and a second plurality of spaced apart, elongated information areas which define a second track portion adjacent said first track portion and which have a geometry such that said information areas of said second plurality produce maximum modulation of the read beam when the radiation is polarized in a direction perpendicular to said first direction and produce minimum modulation of the read beam when the direction of polarization of the radiation is parallel to said first direction.

2. The record carrier according to claim 1 wherein the longitudinal direction of said information areas of said first and second plurality are parallel to the direction of the respective one of said first and second track portions defined thereby and wherein said information areas of said first and second plurality differ from each other in that at least one dimension thereof which is not determined by the information stored thereby is different.

3. The record carrier according to claim 1 or 2 wherein said information areas of said first and second plurality are spaced apart by planar intermediate areas which define a first plane and wherein said information areas of said first and second plurality are pits or projections formed in said record carrier, the bottoms or tops of said pits or projections, respectively, forming said information areas of said first plurality being spaced from said first plane by a distance which is greater than the distance between the bottoms or tops of the pits or projections, respectively, forming said information areas of said second plurality.

4. The record carrier according to claim 3 wherein said pits or projections forming said information areas of said first plurality have longitudinally extending walls which are inclined with respect to the normal to said first plane at a first angle and wherein said pits or projections forming said information areas of said second plurality have longitudinally extending walls which are inclined with respect to said normal at a second angle which is larger than said first angle.

5. The record carrier according to claim 1 wherein said information areas are projections or pits formed in said record carrier and have a phase depth such that the phase depths of said information areas of said first plurality when illuminated with said radiation polarized in said first direction, are substantially equal to the phase depths of said information areas of said second plurality when the latter are illuminated by said radiation polarized in a direction perpendicular to said first direction.

6. The record carrier according to claim 1 or 2 wherein said information areas are projections or pits formed in said record carrier and have a phase depth such that the phase depths of said information areas of said first plurality, when illuminated with said radiation polarized in said first direction, are different from the phase depths of said information areas of said second plurality when the latter are illuminated by said radiation polarized in a direction perpendicular to said first direction.

7. The record carrier according to claim 6 wherein said information areas of said first plurality have a phase depth of approximately 110° and said information areas of said second plurality have a phase depth of approximately 180°.

8. The record carrier according to claim 1 wherein said information areas of said first and second plurality have the same dimensions and wherein the longitudinal direction of the information areas of said first plurality is approximately perpendicular to the longitudinal direction of the information areas of said second plurality.

9. A record carrier as claimed in claim 8, provided with information recorded by a user, which is defined by said first and second track portions, and comprising an optically detectable servo track which includes a sector address associated with each of said first and second track portions, at least one of said track portions being shifted relative to the servo track and transverse to the track direction.

10. The record carrier according to claim 1 wherein said record carrier is in the form of a disc and includes a plurality of said first and second track portions which form at least one generally circular track thereon, said track portions being arranged such that said first track portions alternate with said second track portions along said circular track.

11. The record carrier according to claim 1 wherein said record carrier is in the form of a disc and wherein said first track portion define a first spiral and said second track portion defines a second spiral such that revolutions of said second spiral are interposed between revolutions of said first spiral.

12. The record carrier according to claim 1 wherein said information structure comprises two superposed information layers, one of said information layers containing only information areas of said first plurality and the other of said information layers containing only information areas of said second plurality.

13. The record carrier according to claim 12 wherein said one layer has a plurality of said first track portions which are generally parallel to and spaced from each other and said other layer has a plurality of said second track portions which are generally parallel to and spaced from each other and arranged so that said second track portions are disposed opposite regions of said one layer which are disposed between pairs of adjacent first track portions.

14. The record carrier according to claim 1 wherein said information structure comprises two superposed layers each having a plurality of said first and second track portions, said track portions being arranged so that said first track portions on one of said layers are disposed opposite said second track portions on the other of said layers.

15. The record carrier according to claim 14 wherein said track portions are generally parallel to each other and arranged on the respective layers such that successive first track portions are disposed between successive second track portions.

16. The record carrier according to claim 1 including at least two regions containing material inscribable by a beam of radiation for writing information thereon, each of said regions being associated with a respective one of said first and second track portions, said information areas in each of said first and second track portions defining an address for information to be written in the associated region.

17. The record carrier according to claim 16 wherein at least one of said first and second track portions defines a servo track for guiding the write beam during writing of information.

18. The record carrier according to claim 16 or 12 wherein the longitudinal directions of said information areas defining said first track portion are perpendicular to the longitudinal directions of said information areas defining the adjacent second track portion.

19. A record carrier for storing information readable by a read beam of polarized raditaion, said record carrier comprising a planar member having a first plurality of elongated, spaced apart pits formed therein, said pits of said first plurality having a configuration such that they produce maximum modulation of the read beam when the radiation is polarized in a first direction parallel to the longitudinal direction of said pits of said first plurality and produce maximum modulation of the read beam when the direction of polarization of the radiation is perpendicular to the longitudinal direction thereof, and a second plurality of elongated, spaced apart pits formed in said planar member which have a configuration such that they produce maximum moduation of the read beam when the direction of polarization is perpendicular to said first direction and produce minimum modulation of the read beam when said direction of polarization is parallel to said first direction.

20. The record carrier according to claim 19 wherein, in the plane of the surface of said planar member, the length of said pits is at least twice the effective wavelength of the radiation of the read beam and said length is at least one and a half times greater than the width of said pits in a direction perpendicular to the longitudinal direction of said pits.

21. The record carrier according to claims 19 or 20 wherein said pits of said first and second plurality define a first and second elongated track, respectively, said tracks being disposed adjacent each other and extending in generally parallel directions.

22. The record carrier according to claim 21 wherein the longitudinal directions of said pits of said first and second plurality are parallel to the track direction of the respective one of said first and second tracks defined thereby and wherein said pits of said second plurality have a configuration such that they produce maximum modulation of the read beam when the direction of polarization of the radiation is perpendicular to the longitudinal direction thereof and produce minimum moduation of the read beam when said direction of polarization is parallel to the longitudinal direction thereof.

23. The record carrier according to claim 22 wherein said pits of said first and second plurality have different depths.

24. The record carrier according to claim 22 or 23 wherein said pits of said first and second plurality have longitudinally extending walls, which are inclined at substantially the same angle with respect to the normal to the plane of said planar member.

25. The record carrier according to claim 22 wherein said pits of said first and second plurality have the same depth and have longitudinally extending walls, said wall of said pits of said first plurality being inclined at a first angle with respect to the normal to the plane of said planar member and said walls of said pits of said second plurality being inclined at a second angle with respect to said normal which is different from said first angle.

26. A record carrier for storing information which is readable by a read beam of polarized radiation, said carrier comprising an information structure having a first plurality of spaced apart, elongated information areas which define a first elongated track, which have a width at most of the order of magnitude of the effective wavelength of the radiation and which produce maximum modulation of the beam when the direction of polarization of the radiation is parallel to the longitudinal direction of said information areas of said first plurality and produce minimum modulation of the read beam when said direction of polarization is perpendicular to said longitudinal direction thereof, and a second plurality of spaced apart, elongated information areas which define a second elongated track and which produce maximum modulation of the read beam when the direction of polarization of the radiation is perpendicular to the longitudinal direction of the information areas of said second plurality and produce minimum modulation of the read beam when the direction of polarization of the radiation is parallel to the longitudinal direction thereof.

27. The record carrier according to claim 26 wherein said first and second tracks are adjacent and generally parallel to each other, the longitudinal directions of said information areas of said first plurality are parallel to the longitudinal direction of said first track and the longitudinal directions of said information areas of said second plurality are parallel to the longitudinal direction of said second track.

28. A record carrier for storing information readable by a read beam of polarized radiation, said carrier comprising an information structure having a plurality of spaced apart, elongated information areas which have a width at most of the order of magnitude of the effective wavelength of the radiation and which produce maximum modulation of the read beam when the direction of polarization of the radiation is parallel to the longitudinal direction of said areas and produce minimum modulation of the read beam when said direction of polarization is perpendicular to said longitudinal direction thereof, said information areas being arranged in at least two adjacent, generally parallel elongated tracks, the longitudinal direction of said information areas in each track being parallel to each other and perpendicular to the longitudinal direction of said information areas in the adjacent track so that when one of said tracks is read by the read beam which is polarized in a direction parallel to the longitudinal direction of the information areas in said one track, the information areas in the adjacent, other track produce minimum modulation of the read beam.

29. The record carrier according to claim 28 including a planar member and wherein said information areas are pits formed in said planar member, the length of said pits in the plane of the surface of said planar member being at least twice the effective wavelength of the radiation of the read beam and at least one and one-half times greater than the width of said pits in a direction perpendicular to the longitudinal direction thereof.

30. A system for optically reading information stored by a record carrier having a first plurality of spaced apart, elongated information areas which define a first track and which produce maximum modulation in a beam of radiation polarized in a first direction parallel to the longitudinal direction of the information areas of the first plurality and produce minimum modulation when the direction of polarization is perpendicular to the longitudinal direction thereof, and a second plurality of spaced apart, elongated information areas which define a second track adjacent the first track and which produce maximum modulation of the beam when the direction of polarization of the radition is perpendicular to the first direction and produce minimum modulation when the direction of polarization is parallel to the first direction, said system comprising means for producing a first beam of polarized radiation whose direction of polarization is parallel to said longitudinal direction of the information areas of the first plurality for reading the first track and a second beam of polarized radiation whose direction of radiation is perpendicular to that of said first beam for reading the second track, means for focusing said first and second beam to a spot on said information areas of said first and second tracks, respectively, means for producing relative movement between the record carrier and said spot to thereby scan said tracks so that when the first track is scanned by said spot formed from said first beam maximum modulation of said first beam is produced by the information areas of the first plurality and said first beam is relatively unaffected by the information areas of the second plurality in the adjacent second track and when the second track is scanned by said spot formed from said second beam maximum modulation of said second beam is produced by the information areas of the second plurality and said second beam is relatively unaffected by the information areas of the first plurality in the adjacent first track, and radiation sensitive means for converting said beams modulated by said information areas to an electrical signal.

31. The system according to claim 30 wherein said beam producing means includes means for generating a single beam of polarized radiation and means for varying the direction of polarization of said single beam between one direction which is parallel to said first direction to thereby produce said first beam and a second direction perpendicular to said first direction to thereby produce said second beam.

32. The system according to claim 31 wherein said varying means includes a half-wave plate mounted for movement into and out of the path of said single beam.

33. The system according to claim 31 wherein said generating means is a laser which generates said single beam of polarized radiation and said varying means includes means for supporting said laser for rotation through an angle of 90° about an axis parallel to the longitudinal axis of the beam generated thereby.

34. The system according to claim 33 wherein said laser is a diode laser.

35. The system according to claim 30 wherein the record carrier includes a reflective layer covering the information areas of the first and second plurality and wherein said beam producing means includes means for generating a single beam of polarized radiation whose direction of polarization is inclined at 45° with respect to the first direction, a polarization sensitive beam splitter disposed in the path of said single beam between said generating means and said focussing means, and a polarization rotator disposed in the path of said single beam and the radiation reflected from the information areas, said rotator being disposed between said beam splitter and said focussing means and alternately rotating the direction of polarization of said single beam through an angle of approximately 45° and an angle of approximately −45° to thereby produce said first and second beams.

36. A system for optically reading information stored in a record carrier having a first plurality of spaced apart, elongated information areas which define a first track and which produce maximum modulation in a beam of radiation polarized in a first direction parallel to the longitudinal direction of the information areas of the first plurality and produce minimum modulation when the direction of polarization is perpendicular to the longitudinal direction thereof, and a second plurality of spaced apart, elongated information areas which define a second track adjacent the first track and which produce maximum moduation of the beam when the direction of polarization of the radiation is perpendicular to the first direction and produce minimum modulation when the direction of polarization is parallel to the first direction, said system including means for generating a beam of polarized radiation whose direction of polarization is inclined at an angle of approximately 45° with respect to the first direction, means for focussing said beam to a spot on said information areas, means for producing relative movement between said spot and said record carrier to thereby scan said tracks with said spot and a polarization sensitive radiation detecting means for converting said beam modulated by said information areas to an electrical signal.

37. The system according to claim 36 wherein said detector means includes a polarization sensitive beam splitter for directing the modulated beam from the record carrier along two different paths and a radition sensitive detector disposed in each of said paths.

38. An apparatus for reading and writing information on a record carrier having a substrate and a layer of radiation inscribable material disposed thereon, said apparatus including means for producing a write beam of radiation, means for forming, from said write beam, an elongated spot on said layer, means for varying the intensity of said write beam in accordance with information to be written between a first level at which the intensity of the radiation in said spot is sufficient to form in said layer an elongated pit and a second, lower level of intensity which does not produce said pit, means for moving one of said beam and said record carrier relative to the other so as to produce in said layer a first plurality of elongated pits whose longitudinal directions are generally parallel to each other and which define a first information track, and means for changing the orientation of said elongated spot so that the longitudinal axis thereof is rotated through an angle of approximately 90° so as to produce, in said layer, a second plurality of pits whose longitudinal directions are generally parallel to each other and perpendicular to the longitudinal direction of said pits of said first plurality and which define a second information track, and means for producing a first and second read beam of polarized radiation such that the direction of polarization of one of said first and second read beams is perpendicular to the direction of polarization of the other read beam and parallel to the longitudinal direction of the pits of one of said first and second plurality, for reading said information tracks.

39. The apparatus according to claim 38 wherein said information tracks are adjacent and generally parallel to each other and extend in a direction which is inclined at an angle of approximately 45° with respect to the longitudinal directions of said pits.

40. The apparatus according to claim 38 or 39 wherein said changing means includes means for introducing astigmism in said write beam rotatably supported in the path of said write beam.

41. The apparatus according to claim 38 or 39 wherein said means for producing said write beam includes a diode laser and said means for changing includes means for supporting said laser for rotation about an axis parallel to the axis of said write beam.